US005322969A

United States Patent [19]

Aaroe et al.

[11] Patent Number: 5,322,969

[45] Date of Patent: Jun. 21, 1994

[54] PIEZOELECTRIC TRANSDUCER SADDLE FOR STRINGED MUSICAL INSTRUMENTS

[75] Inventors: Kenneth T. Aaroe, Vernalis, Calif.; Donald D. Markley, 12911 Pierce Rd., Saratoga, Calif. 95070

[73] Assignee: Donald D. Markley, Saratoga, Calif.

[21] Appl. No.: 855,374

[22] Filed: Mar. 20, 1992

[51] Int. Cl.[5] .............................................. G01H 3/18

[52] U.S. Cl. ................................ 84/731; 84/DIG. 24

[58] Field of Search .......................... 84/731, DIG. 24

[56] References Cited

U.S. PATENT DOCUMENTS

| | | | |
|---|---|---|---|
| 4,314,495 | 2/1982 | Baggs | 84/731 |
| 4,378,721 | 4/1983 | Kaneko et al. | 84/731 |
| 4,750,397 | 6/1988 | Ashworth-Jones | 84/731 |

*Primary Examiner*—Stanley J. Witkowski
*Attorney, Agent, or Firm*—Robert O. Guillot

[57] ABSTRACT

The piezoelectric transducer saddle of the present invention is a thin, generally rectangular member that is designed to fit into the bridge slot of a musical instrument such as a guitar. The piezoelectric element is oriented vertically in the saddle and constitutes a structural member of the saddle. In a first embodiment of the saddle, a piezoelectric element forms the saddle itself. Electrical contacts are engaged to the sides of the piezoelectric element to produce electrical output. A preferred embodiment of the saddle is a laminated structure wherein the laminated layers are disposed vertically, and a vertical layer composed of a piezoelectric material is generally centrally disposed within the laminated structure. A metallic electrical contact is engaged on each side of the piezoelectric material to receive electrical signals generated by the piezoelectric material. In one embodiment, one of the electrical contacts is formed as a metallic layer which rises to the upper surface of the saddle to make contact with the strings of the musical instrument, in order to provide a ground for the metallic musical strings of the instrument. Further embodiments of the present invention utilize multiple piezoelectric elements and shaped piezoelectric elements to produce enhanced performance.

22 Claims, 3 Drawing Sheets

PIEZOELECTRIC TRANSDUCER SADDLE FOR STRINGED MUSICAL INSTRUMENTS

BACKGROUND OF THE INVENTION

1. Field of the Invention

The present invention relates generally to electrical devices for generating musical tones in stringed instruments, and more particularly to saddles and bridges having piezoelectric transducers engaged therein or thereto.

2. Brief Description of the Prior Art

Stringed musical instrument saddles having piezoelectric transducers engaged thereto or disposed therewithin have been known for many years. Significant prior art includes the following patents.

U.S. Pat. No. 4,314,475 issued to L. R. Baggs, teaches a saddle having a piezoelectric transducer assembly disposed therewithin. The transducer assembly includes both horizontally disposed and vertically disposed piezoelectric elements, however the piezoelectric elements do not comprise a significant structural portion of the saddle, as is disclosed in the present invention.

U.S. Pat. No. 4,356,754 issued to L. R. Fishman, teaches a vibration transducer for a stringed instrument that has a piezoceramic wafer laminated to a brass plate (col. 4, l. 43). U.S. Pat. No. 4,378,721 issued to K. Kaneko et al., teaches a pickup for a string instrument that has a transverse piezo element of ceramic powder mixed with a synthetic resin. U.S. Pat. No. 4,580,480 issued to W. H. Turner, teaches a simple piezo pickup for an acoustic guitar, comprising a piezo transducer 17 (col. 3, l. 35) inserted beneath the saddle. U.S. Pat. No. 4,491,051 issued to L. M. Baucus, teaches four piezoelectric crystals, of alternating polarity that are enclosed in the lower part of a saddle structure between an upper ground conductor and a lower conductor which rests on an insulating sheet. An outer foil wrapping provides shielding (col. 14, l. 48) and is insulated from the conductors by an insulator sheet (col. 14, l. 39). U.S. Pat. No. 4,657,114 issued to T. P. Shaw, teaches a bridge pickup includes an array of piezo elements in a holder, encapsulated in a cast polymer member. U.S. Pat. No. 4,774,867 and U.S. Pat. No. 4,727,634 issued to L. R. Fishman, teaches small disk-shaped piezo crystals that are located between a resilient, conductive top layer and a ground plane. The top layer contacts the copper cladding of a circuit board. The assembly is inserted into a conventional saddle (col. 3, l. 9). U.S. Pat. No. 4,030,396 issued to R. E. Mariner, teaches a piezo crystal that is embedded in resilient resin adjacent a mass (FIG. 4).

SUMMARY OF THE INVENTION

It is an object of the piezoelectric transducer saddle of the present invention to provide enhanced sound pickup from vibrating musical strings.

It is another object of the present invention to provide a saddle which includes an electrical ground for metallic strings.

It is a further object of the present invention to provide a saddle which includes a piezoelectric transducer that is disposed proximate the contact point of the guitar string with the saddle, whereby substantially unattenuated string vibrations are transmitted to the piezoelectric material to create strong electrical signals.

It is yet another object of the present invention to provide a saddle which includes a piezoelectric element as a structural member of the saddle, such that string vibrations must pass through the element to the body of the musical instrument.

It is yet another object of the present invention to provide a saddle having a piezoelectric element which is disposed in a perpendicular relationship relative to the strings of the instrument.

It is still another object of the present invention to provide a saddle having a piezoelectric transducer disposed therewithin which comprises a laminated structure wherein preferred sound transmitting materials are utilized to transmit sound vibrations from the saddle to the bridge.

It is still a further object of the present invention to provide an improved saddle which is easily retrofit into existing bridge saddle slots, whereby alteration of existing saddle slots is not required.

The piezoelectric transducer saddle of the present invention is a thin, generally rectangular member that is designed to fit into the bridge slot of a musical instrument such as a guitar. The piezoelectric element is oriented vertically in the saddle and constitutes a structural member of the saddle. A first embodiment of the saddle comprises a piezoelectric element that forms the saddle itself. Electrical contacts are engaged to the sides of the piezoelectric element to produce electrical output. A preferred embodiment of the saddle is a laminated structure wherein the laminated layers are disposed vertically, and a vertical layer composed of a piezoelectric material is generally centrally disposed within the laminated structure. A metallic electrical contact is engaged on each side of the piezoelectric material to receive electrical signals generated by the piezoelectric material. In one embodiment, one of the electrical contacts comprises a metallic layer which rises to the upper surface of the saddle to make contact with the strings of the musical instrument, in order to provide a ground for the metallic musical strings of the instrument. Further embodiments of the present invention utilize multiple piezoelectric elements and shaped piezoelectric elements to produce enhanced performance.

It is an advantage of the piezoelectric transducer saddle of the present invention that it provides enhanced sound pickup from vibrating musical strings.

It is another advantage of the present invention that it provides a saddle which includes an electrical ground for metallic strings.

It is a further advantage of the present invention that it provides a saddle which includes a piezoelectric transducer that is disposed proximate the contact point of the guitar string with the saddle, whereby substantially unattenuated string vibrations are transmitted to the piezoelectric material to create strong electrical signals.

It is yet another advantage of the present invention that it provides a saddle which includes a piezoelectric element as a structural member of the saddle, such that string vibrations must pass through the element to the body of the musical instrument.

It is yet another advantage of the present invention that it provides a saddle having a piezoelectric element which is disposed in a perpendicular relationship relative to the strings of the instrument.

It is still another advantage of the present invention that it provides a saddle having a piezoelectric transducer disposed therewithin which comprises a laminated structure wherein preferred sound transmitting materials are utilized to transmit sound vibrations from the saddle to the bridge.

It is still a further advantage of the present invention that it provides an improved saddle which is easily retrofit into existing bridge saddle slots, whereby alteration of existing saddle slots is not required.

These and other objects, features and advantages of the present invention will become apparent to those skilled in the art after having read the following detailed description of the preferred embodiments which are illustrated in the several figures of the drawing.

IN THE DRAWING

Figure 18:
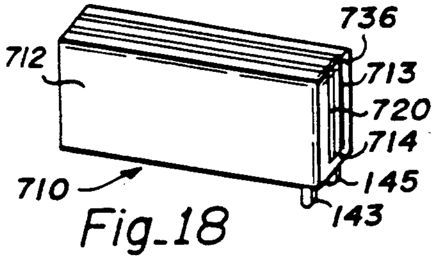
Figure 19:
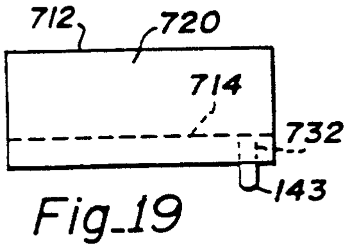
Figure 20:
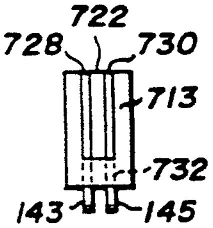
Figure 21:
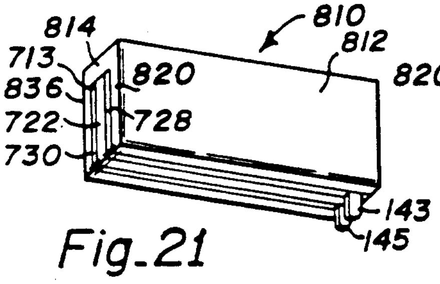
Figure 22:
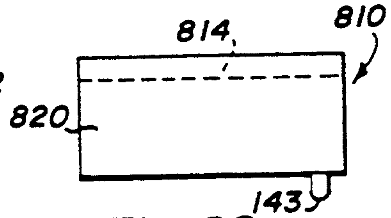
Figure 23:
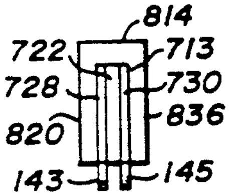
Figure 24:
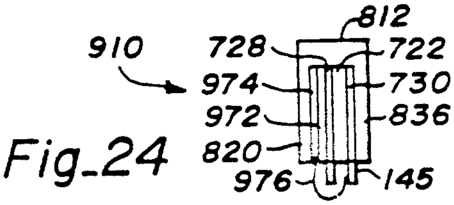

FIG. 18 a perspective view depicting yet a further embodiment of the present invention;

FIG. 19 is a front elevational view of the device depicted in FIG. 18;

FIG. 20 is a side elevational view of the device depicted in FIGS. 18 and 19;

FIG. 21 a perspective view depicting yet a further embodiment of the present invention;

FIG. 22 is a front elevational view of the device depicted in FIG. 21;

FIG. 23 is a side elevational view of the device depicted in FIGS. 21 and 22; and FIG. 24 is a side elevational view of an alternative embodiment of the device depicted in FIG. 23.

DETAILED DESCRIPTION OF THE PREFERRED EMBODIMENTS

Figure 1:
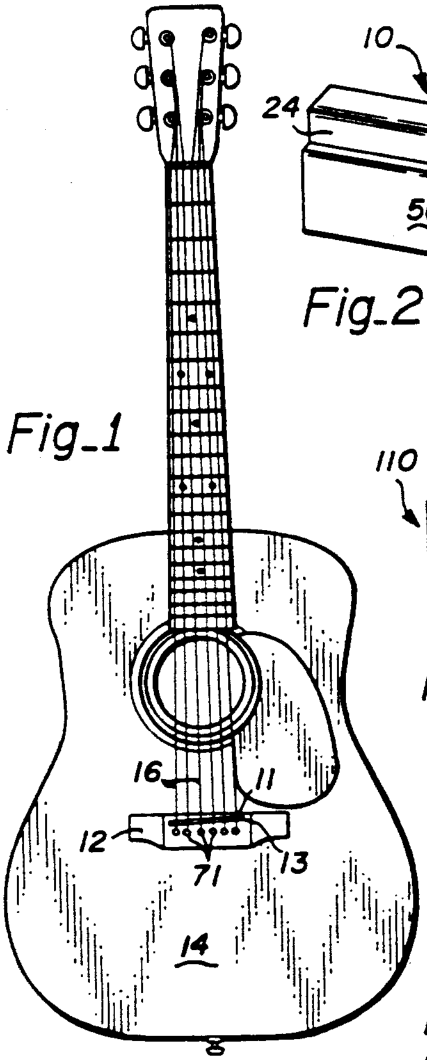
FIG. 1 is a perspective view of a guitar which includes a piezoelectric transducer saddle of the present invention.

As depicted in FIG. 1, a piezoelectric transducer saddle 11 is designed to be inserted into a saddle slot 13 formed in the bridge 12 of a guitar or similar musical instrument 14. As is typical in the configuration of a guitar, the strings 16 of the guitar are strung across the top edge of the saddle 11, and as is well known in the art, the musical vibrations of the strings are transmitted through the saddle 11 to the bridge 12 and thereafter to the body of the guitar 14. As is also well known in the prior art, the placement of piezoelectric transducers within the saddle permits the generation of electrical signals from the transducers that are related to the sound vibrations passing through the saddle. The pickup and amplification of the electrical signals is then accomplished to produce electronically amplified music.

Figure 2:
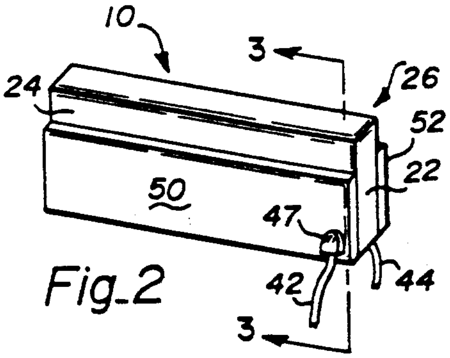
FIG. 2 is a perspective view of a first embodiment of the piezoelectric transducer saddle of the present invention.
Figure 3:
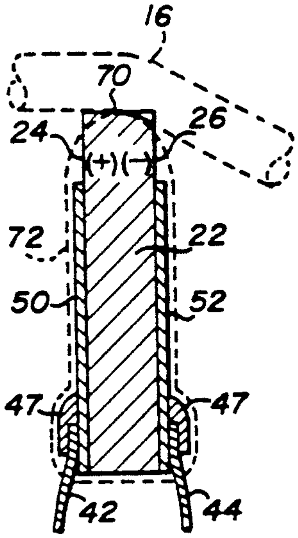
FIG. 3 is a side cross-sectional view of the saddle depicted in FIG. 2, taken along lines 3—3 of FIG. 2.

A first embodiment 10 of the saddle of the present invention is depicted in FIGS. 2 and 3, wherein FIG. 2 is a perspective view of the saddle 10 and FIG. 3 is a side cross-sectional view taken along lines 3—3 of FIG. 2. As depicted in FIGS. 2 and 3, the saddle 10 comprises a single, unitary piece of piezoelectric material 22 that is fairly thin and generally rectangular in shape, with a frontward face 24 and a rearward face 26. The piezoelectric material is designed to be oriented vertically in the bridge slot 13, such that the electrical signals generated by the piezoelectric material emanate from the front surface 24 and the rearward surface 26 upon the mechanical deformation of the piezoelectric material 22. Two electrical connection wires 42 and 44 are engaged to the saddle 10, such as by soldering 47 to receive electrical signals from the frontward surface 24 and rearward surface 26 respectively. To facilitate good electrical interconnection between the piezoelectric material 22 and the electrical connections 42 and 44, an electrically conductive outer layer 50 and 52 is adhered to the surfaces 24 and 26 respectively. It is preferred that the layers 50 and 52 be composed of a good electrically conductive material such as silver or nickel. Piezoelectric material having a silver or nickel outer layer is commercially available from many sources; a preferred piezoelectric material is ceramic lead zirconate titanate, although other piezoelectric materials such as ceramic lead titanate, powdered piezoelectric ceramic materials in a rubberized base, as described in U.S. Pat. No. 4,378,721, and polyvinylidene difluoride may also be utilized.

To facilitate the installation of the saddle 10 into existing bridge slots 13, the length of the saddle 10 may be adjusted, such as by grinding or filing to fit existing slots. The height of the saddle 10 is likewise modified into a preferred arc shape by filing or grinding. Thereafter, the top surface 70 is rounded (as shown in phantom) in FIG. 3 to provide an appropriate contact point for a guitar string 16 also shown in phantom in FIG. 3.

To prevent hum and other sound distortion effects, the conductive layers 50 and 52 would normally not contact any electrically conductive musical strings or other outside conductive elements that might act as an antenna or otherwise introduce extraneous input. To protect the saddle 10 from such extraneous sources, the conductive layers 50 and 52 are cut away from the upper surface 70 of the piezoelectric material 22. Additionally, a protective nonconductive coating 72, shown in phantom in FIG. 3, may be formed around the saddle 10, such as by dipping into a liquid plastic bath following the engagement of the connective wires 42 and 44 to the layers 50 and 52 of the device 10. As is well known, the electrically conductive guitar strings may be grounded to prevent extraneous electrical signals from influencing the signals from the saddle 10. Such electrical grounding is easily accomplished at the rearward bridge pins 71 which tie down the strings 16. Alternatively, the coating 52 may extend upwardly to make electrical contact with the electrically conductive strings if the connection wire 44 is connected to the grounded input of an amplifier; such a grounding arrangement is discussed in detail hereinbelow. It is also possible to utilize an electrical shield plate that is engaged in front of the nonconductive coating 72, and to electrically connect the shield plate to the connection 44 to shield the hot connection 42. Such a shield plate is discussed in detail hereinbelow.

It is therefore to be understood that the saddle embodiment 10 comprises a single, vertically oriented piezoelectric material element that is basically the entire structural entity that is the saddle of the guitar. All sound vibrations generated by the strings 16 of the musical instrument must pass through the piezoelectric material 22, whereby the saddle 10 provides a strong electrical output representative of the string vibrations.

Figure 4:
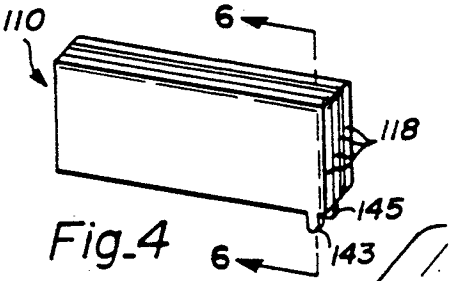
FIG. 4 is a perspective view of a second embodiment of the present invention.
Figure 5:
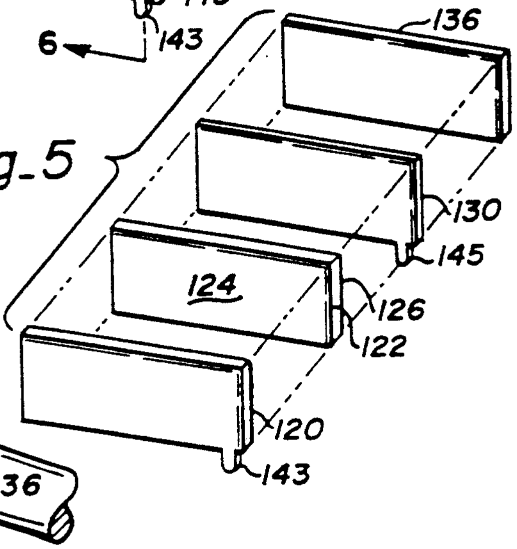
FIG. 5 is an assembly drawing of the embodiment depicted in FIG. 4.
Figure 6:
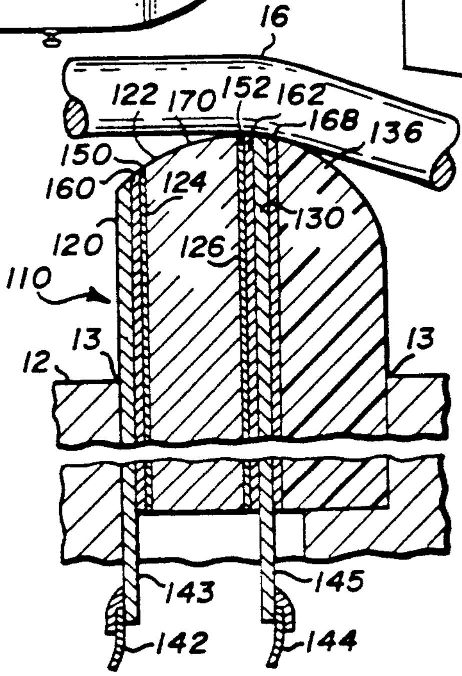
FIG. 6 is a side cross-sectional view of the embodiment depicted in FIGS. 4 and 5, taken along lines 6—6 of FIG. 4.

The structure of a second embodiment of the saddle 110 is best understood from a consideration of FIGS. 4, 5 and 6, wherein FIG. 4 is a perspective view of the saddle 110 FIG. 5 is an assembly drawing, and FIG. 6 is a side cross-sectional view of the saddle 110 taken along lines 6—6 of FIG. 4 engaged within a bridge slot 13 of a bridge 12. As depicted in FIG. 4, the saddle 110 is a flat, thin, generally rectangular member that is formed from a plurality of laminated layers 118. Each of the layers 118 has a thin, generally rectangular structure, and the layers 118 are laminated together along their flat rectangular surfaces.

A detailed depiction of the laminated structure of the saddle 110 is provided in FIG. 5 and in FIG. 6. The laminated structure of the saddle 10 includes a first layer 120 that is composed of a conductive material, such as a metal. In this embodiment 110, the layer 120 is preferably composed of brass, because it is an electrically conductive material that is easy to work with and solder to, although other materials such as nickel, copper and stainless steel can be utilized.

A second significant layer 122 of the saddle 110 is composed of a piezoelectric material. In the embodiment 110, the piezoelectric material is ceramic lead zirconate titanate, however other suitable piezoelectric materials, such as ceramic lead titanate, powdered piezoelectric ceramic materials in a rubberized base, as described in U.S. Pat. No. 4,378,721, and polyvinylidene difluoride may be utilized. The piezoelectric layer 122 is formed with a forward flat surface 124, disposed proximate the first layer 120, and a rearward flat surface 126. The piezoelectric material comprising the layer 122 is disposed with regard to its electrical properties such that the frontward surface 124 and the rearward surface 126 are capable of generating an electrical current when the piezoelectric material is deformed.

A third significant layer 130 in the laminated structure of the saddle 110 is disposed immediately behind the piezoelectric material layer 122. The layer 130 is composed of an electrically conductive material and, in this embodiment 110, is preferably composed of brass, although stainless steel, copper or nickel may also be utilized.

A fourth significant layer 136 of the saddle 110 is disposed rearwardly of the third layer 130. In this embodiment 110, the fourth layer 136 is preferably composed of a standard saddle composition material, such as mycarta, corian, graphite, ivory or a suitable plastic. While the fourth layer 136 might be composed of any type of rigid material, musical artists apparently prefer particular types of materials, such as mycarta, to transmit the string vibrations from the saddle 110 to the bridge 12 to produce a certain fullness or other desired properties to the sound of the instrument. Additionally, it is preferable that the fourth layer 136 be composed of a material that may be easily worked, such as by filing or grinding, such that the overall thickness of the saddle 110 may be mechanically altered to fit into the varying bridge slots of various musical instruments that may vary in width.

To accomplish the electrical connection of the saddle 110 to an amplifier (not shown) a first electrical connection wire 142 is engaged to the pin 143 of the electrically conductive layer 120, and a second electrical connection wire 144 is engaged to the pin 145 of the electrically conductive layer 130.

It is to be understood that the proper functioning of the saddle 110 requires a good electrical interconnection between the piezoelectric material in layer 122 and the electrically conductive layers 120 and 130 respectively. To provide a good electrical interconnection, the frontward surface 124 of the piezoelectric material 122 is coated with an electrically conductive coating 150, preferably composed of silver or nickel. Likewise, the rearward surface 126 of the piezoelectric material 122 also has a coating 152 that is composed of a good electrical conductor such as silver or nickel. To achieve a good electrical connection between the layers 120 and 122, a bonding layer 160 is utilized which is composed of an electrically conductive adhesive. The adhesive layer 160 is disposed between the frontward silver coating 150 and the first layer 120.

Such electrically conductive adhesives comprise an adhesive material that includes a significant quantity of electrically conductive particles, whereby electrically conductive pathways are formed through the adhesive. A preferred adhesive is a cyano-acrylate glue such as that identified by the trademark 37 CA 40, and it is introduced between the layers 120 and 122 following the insertion of electrically conductive particles between the layers 120 and 122.

To accomplish an electrical connection between the piezoelectric material 122 and the layer 130, an electrically conductive adhesive layer 162 (composed of the same electrically conductive adhesive material as layer 160) is disposed between the rearward silver coating 152 and the third layer 130. An adhesive layer 168 is also disposed between the third layer 130 and the fourth layer 136 to bond those layers 130 and 136 together in the laminated structure of the saddle 110. The adhesive layer 168 need not be electrically conductive as the layer 136 is not electrically conductive.

The saddle 110 is designed for simple installation into existing bridge slots. As such slots vary in width, the layer 136 of mycarta may be narrowed, such as by filing, to facilitate its installation into the bridge slot 13. Existing bridge slots also vary in length, and the saddle 110 is designed such that its length may be altered, such as by grinding or filing, to easily fit into the existing bridge slots. Likewise, the top surface of the saddle 110 is designed to be modified to match existing guitars. Specifically, the top surface is filed or ground to produce a particular height and arc across the length of the saddle 110. Thereafter, the top surface of the saddle 110 must be rounded 170 such that an appropriate contact is made with the guitar string 16.

It is therefore to be appreciated that the musical vibrations of the string 16 are transmitted to the piezoelectric material layer 122 through the physical contact of the string 16 with the rounded upper surface 170 of the saddle 110. The mechanical vibrations of the piezoelectric material 122 then create electrical currents within the piezoelectric material 122 which pass through the electrically conductive layers 150, 160 and 152, 162 to the first and third electrically conductive layers 120 and 130 respectively. The electrical outputs of the piezoelectric material 122 are then fed through the connection wires 142 and 144 to an electronic amplifier (not shown) for amplification and audible broadcast.

Where the musical string 16 is composed of an electrically conductive material, such as steel, extraneous signal pickup or a humming sound may be created. To minimize this effect, the curved upper surface 170 of the saddle 110 is shaped such that the electrically conductive strings 16 make physical contact with the electrically conductive third layer 130. Additionally, the electrical connection 144 from the layer 130 is connected to the ground connection of the amplifier hookup, and the electrical connection 142 from the first layer 120 is then the live or hot connection.

It is to be understood that the piezoelectric material layer 122 comprises a significant structural element of the saddle 110, whereby practically all of the musical string vibrations that cause mechanical distortion of the saddle 110 will pass through the piezoelectric material layer 122. Thus, the vertical orientation of the piezoelectric layer 122 within the saddle 110 provides for a significant enhancement in signal strength.

Figure 7:
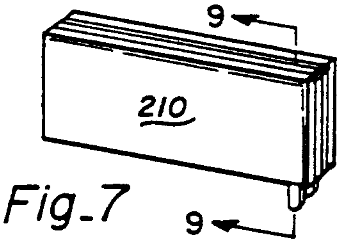
FIG. 7 is a perspective view of a preferred embodiment of the piezoelectric transducer saddle of the present invention.
Figure 8:
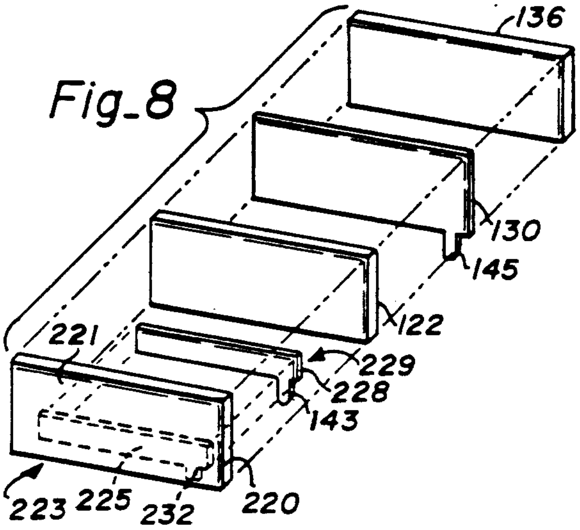
FIG. 8 is an assembly drawing of the embodiment depicted in FIG. 7.
Figure 9:
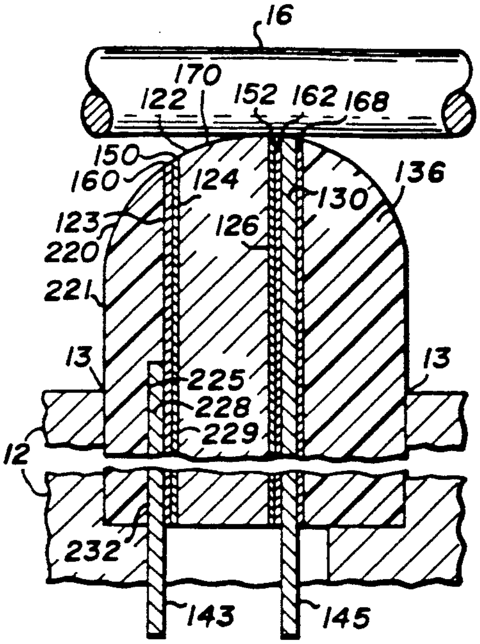
FIG. 9 is a side cross-sectional view of the embodiment depicted in FIGS. 7 and 8, taken along lines 9—9 of FIG. 7.

A preferred saddle embodiment 210 is depicted in FIGS. 7, 8 and 9, wherein FIG. 7 is a perspective view, FIG. 8 is an assembly drawing and FIG. 9 is a side cross-sectional view taken along lines 9—9 of FIG. 7. The preferred embodiment 210 differs from the second embodiment 110 in the structural and electrical makeup of the first layer 120. Thus, identical elements of the embodiment 210 with the embodiment 110 are numbered identically in FIGS. 7, 8 and 9.

As depicted in FIGS. 7, 8 and 9, the piezoelectric transducer saddle 210 is a laminated structure that includes a first layer 220 having a frontward surface 221 and a rearward surface 223. A portion of the rearward surface 223 is cut away to form an electrical contact cavity 225. An electrical contact 228 is engaged within the cavity 225. The contact 228 is formed with a generally flat rearward surface 229 for making a good electrical connection with the electrically conductive adhesive layer 160, such that electrical signals from the piezoelectric material in layer 122 will be conducted through the coating 150 to the contact 228. A slot 232 is formed through the base of the layer 220 to permit an electrical connection pin 143 to pass downwardly for electrical connection.

In the preferred embodiment, the contact 228 is formed from an electrically conductive metal such as brass, and the first layer 220 is formed from a material such as mycarta, corian, graphite, ivory or a suitable plastic. Generally, the material which composes the fourth layer 136 is also utilized to form the first layer 220 in order to provide a quality of sound vibration conduction from the saddle material to the bridge material which is most pleasing to musicians.

It is therefore generally to be understood that the preferred embodiment 210 differs from the first embodiment 110 in the construction and composition of the first layer 220 and electrical contact 228 of the device. While both embodiments produce excellent sound pickup from the vibrating strings, the inventor believes that the embodiment 210 will be preferred by some musicians due to the fact that the sound transmission contact between the saddle material and the bridge material is through the mycarta (or similar material) to the bridge (generally formed of wood). The second embodiment 110 provides for a frontward contact between the metallic first layer 120 and the bridge material and a rearward contact between the fourth layer (composed of mycarta or a similar material) and the wood of the bridge. It is believed that such an arrangement 110 may produce a slightly harsher tonal quality which may or may not be preferred by some musicians.

As with the embodiments 10 and 110, the piezoelectric material layer 122 of embodiment 210 comprises a significant structural element of the saddle 210, whereby practically all of the musical string vibrations that cause mechanical distortion of the saddle 210 will pass through the piezoelectric material layer 122. Thus, the vertical orientation of the piezoelectric layer 122 within the saddle 210 provides for a significant enhancement in signal strength.

Figure 10:
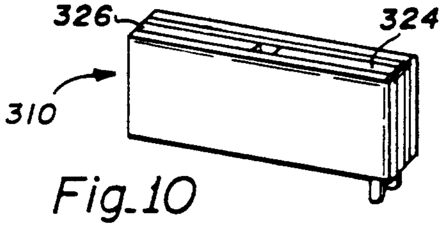
FIG. 10 is a perspective view of another embodiment of the present invention.
Figure 11:
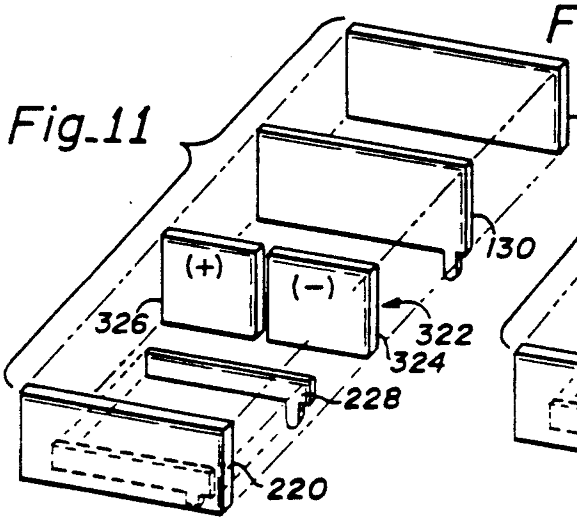
FIG. 11 is an assembly drawing of the embodiment depicted in FIG. 10.

FIGS. 10 and 11 depict another alternative embodiment 310 of the present invention, wherein FIG. 10 is a perspective view and FIG. 11 is an assembly drawing. As will be understood by a comparison of the embodiment 210 depicted in FIGS. 7, 8 and 9 with the embodiment 310 depicted in FIGS. 10 and the significant difference between the two embodiments is the configuration of the piezoelectric material. Specifically, whereas the piezoelectric material 122 of the preferred embodiment 210 is formed as a single piece, the piezoelectric material 322 of the embodiment 310 is formed from two pieces 324 and 326. Furthermore, as is depicted in FIG. 11, the polarity of one of the pieces 324 or 326 is reversed relative to the polarity of the other piece 326 or 324, respectively. It is to be noted that the two pieces 324 and 326 are electrically connected to the single electrical contact 228 on the front side and the single electrical contact 130 on the back side. The effect of this piezoelectric material arrangement is to provide two out of phase signals where both pieces 324 and 326 receive the same vibrational signal, such as will occur from extraneous sound input, such as tapping upon the body of the musical instrument.

As with the prior embodiments 10, 110 and 210, the piezoelectric material layer 322 comprises a significant structural element of the saddle 310, whereby practically all of the musical string vibrations that cause mechanical distortion of the saddle 310 will pass through the piezoelectric material layer 322. Thus, the vertical orientation of the piezoelectric layer 322 within the saddle 310 provides for a significant enhancement in signal strength.

Figure 12:
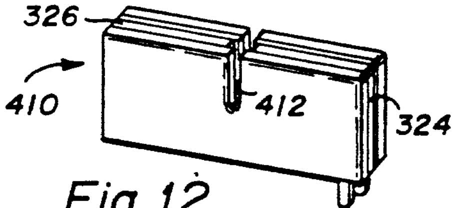
FIG. 12 is a perspective view of a further embodiment of the present invention.
Figure 13:
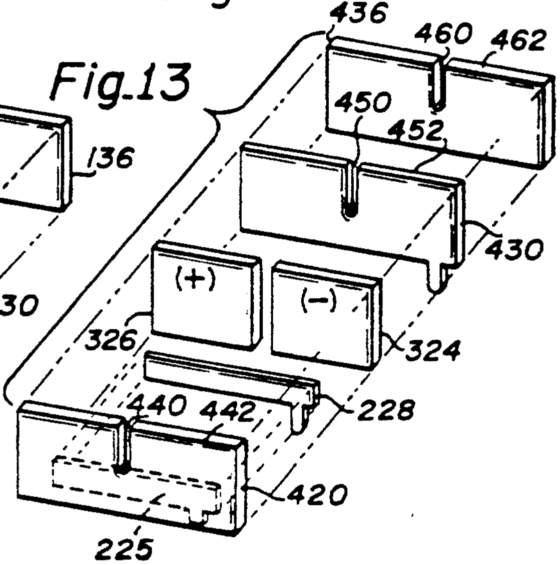
FIG. 13 is an assembly drawing of the embodiment depicted in FIG. 12.

A further alternative embodiment of the present invention 410 is depicted in FIGS. 12 and 13, wherein FIG. 12 is a perspective view and FIG. 13 is an assembly drawing. A comparison of the embodiment 310 depicted in FIGS. 10 and 11 with the embodiment 410 depicted in FIGS. 12 and 13 reveal that the significant difference between the two embodiments 310 and 410 is the formation of a centrally disposed vertical groove 412 formed downwardly through portions of the saddle 410. As can be seen in FIG. 12, is aligned with the gap between the two pieces of piezoelectric material 324 and 326.

As can be seen from FIG. 13, the first layer 420 of the embodiment 410 is formed with a centrally disposed, vertically oriented notch 440 which projects downwardly from the upper surface 442 of the layer 420. The depth of the notch 440 is such that it does not project through the cut out space 225 formed for holding the frontward electrical contact 228. A notch 450 is formed downwardly from the upper edge 452 of the rearward electrical contact layer 430. The notch 450 is formed in alignment with the notch 440 of the first layer 420. A notch 460 is formed downwardly from the upper edge 462 of the fourth layer 436 in alignment with the notches 450 and 440 of the layers 430 and 420 respectively. The effect of the notch 412 formed through the layers 420, 430 and 436 is to enhance the differential vibrational and electrical effects that are generated by the two pieces of piezoelectric material 324 and 326, such that enhanced sound characteristics are produced.

As with the prior embodiments, the piezoelectric material layer 322 of embodiment 410 comprises a significant structural element of the saddle 410, whereby practically all of the musical string vibrations that cause mechanical distortion of the saddle 410 will pass through the piezoelectric material layer 322. Thus, the vertical orientation of the piezoelectric layer 322 within the saddle 410 provides for a significant enhancement in signal strength.

Figure 14:
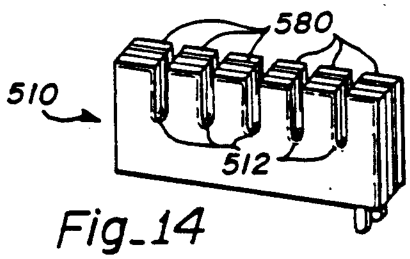
FIG. 14 depicts yet another embodiment of the present invention.
Figure 15:
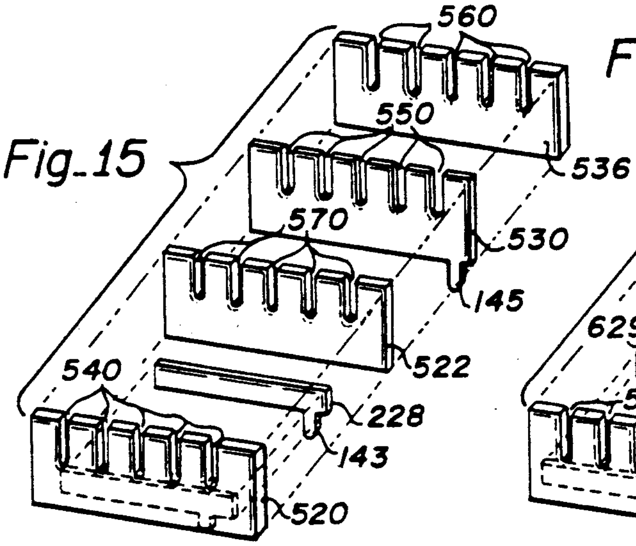
FIG. 15 is an assembly drawing of the device depicted in FIG. 14.

Yet another embodiment 510 of the present invention is depicted in FIGS. 14 and 15, wherein FIG. 14 is a perspective view and FIG. 15 is an assembly drawing. The embodiment 510 possesses two significant differences from the embodiment 410 discussed hereinabove. Firstly, as is best seen in FIG. 14, the embodiment 510 is formed with five vertically oriented notches 512. Each of these notches is similar to notch 412 formed in the alternative embodiment 410. Thus, each of the layers 520, 530 and 536 is formed with a series of aligned vertically disposed notches 540, 550 and 560 respectively.

The other significant difference between the further embodiment 510 and the embodiment 410 is that the piezoelectric material 522 is formed from a single piece, yet it includes five vertically disposed notches 570 which are formed in alignment with the notches 540, 550 and 560 previously discussed. Thus, as is seen in FIG. 14, the saddle 510 essentially comprises six vertically oriented string support portions 580. Each of the string support portions 580 is capable of a degree of independent vibrational activity as it is activated by a musical string that is disposed thereon. However, owing to the unitary nature of the piezoelectric material layer 522, all of the vibrations, and electrical signals generated thereby, are transmitted to the two electrical contact layers 228 and 530, whereby a combined electrical output is generated at the pins 143 and 145. An advantage of the separate string support portions 580 is that they may be varied in their width and height (as controlled by the placement and depth of the notches 512), such that the strength of the string vibration signals generated from the different portions 580 may be varied, to produce an effect called voicing. This voicing of the saddle can be particularly useful where a musical instrument has one or more strings that are particularly soft or loud, to effect the electrical output signal related to the particular support portion 580 that interfaces with the particular string 16.

As with the prior embodiments, the piezoelectric material layer 522 comprises a significant structural element of the saddle 510, whereby practically all of the musical string vibrations that cause mechanical distortion of the saddle 510 will pass through the piezoelectric material layer 522. Thus, the vertical orientation of the piezoelectric layer 522 within the saddle 510 provides for a significant enhancement in signal strength.

Figure 16:
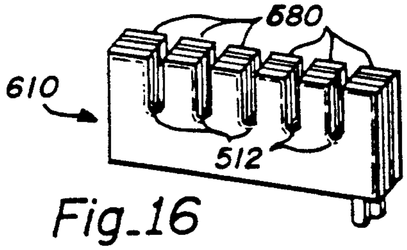
FIG. 16 depicts yet another embodiment of the present invention.
Figure 17:
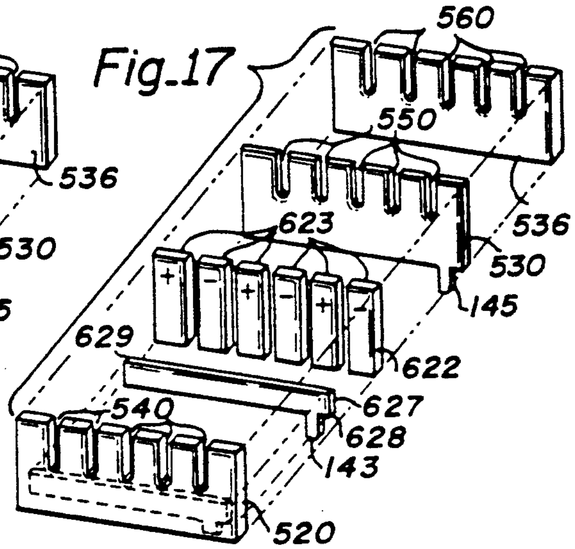
FIG. 17 is an assembly drawing of the device depicted in FIG. 16.

FIGS. 16 and 17 depict yet another embodiment of the saddle 610 of the present invention, wherein FIG. 16 is a perspective view and FIG. 17 is an assembly drawing. As depicted in FIGS. 16 and 17, the embodiment 610 is similar in many respects to the embodiment 510 discussed hereinabove; the significant differences being the configuration of the piezoelectric material layer 622 and the lengthening of the ends 627 and 629 of the frontward electrical contact 628. Specifically, the piezoelectric material layer 622 comprises six separate, flat, vertically oriented pieces of piezoelectric material 623. The polarity of alternating pieces 623 is reversed, whereby sound vibrations that are common to all six pieces 623 will be effectively minimized by the alternating in phase and out of phase pickup of the common vibrations. The independent vibrations of the upwardly projecting portions 680 will be transformed into electrical signals that are transmitted to the electrical contacts 628 and 530. The ends 627 and 629 of the forward electrical contact 628 are sufficiently elongated to assure a electrical contact with the two outwardly disposed piezoelectric pieces 623 which are a part of the piezoelectric layer 622. As with the previously discussed saddle embodiments, the dimensions of the saddle 610 may be adjusted in length, thickness and height to accommodate particular musical instrument saddle slots.

As with the prior embodiments, the piezoelectric material layer 622 comprises a significant structural element of the saddle 610, whereby practically all of the musical string vibrations that cause mechanical distortion of the saddle 610 will pass through the piezoelectric material layer 622. Thus, the vertical orientation of the piezoelectric layer 622 within the saddle 610 provides for a significant enhancement in signal strength.

Yet a further embodiment 710 of the present invention is depicted in FIGS. 18, 19 and 20, wherein FIG. 18 is a perspective View, FIG. 19 is a front elevational view and FIG. 20 is a side elevational view. As is seen in FIGS. 18, 19 and 20, the saddle 710 includes a generally rectangular receptacle 712 having a U-shaped slot 713 formed within its thickness, such that the height of the U-shaped slot 713 is a substantial portion of the height of the receptacle 712. The receptacle may be thought of as having a base portion 714 and two upwardly projecting leg portions 720 and 736. The preferred material which comprises the receptacle 712 is mycarta or other similar materials discussed hereinabove, and the upwardly projecting legs 720 and 736 may be thought of as generally corresponding to the first and fourth mycarta layers, such as layers 520 and 536 previously discussed. Disposed within the U-shaped slot 713 of the receptacle 712 are a frontward, generally rectangularly shaped electrical contact 728, a generally rectangularly shaped piezoelectric material layer 722 and a rearward electrical contact layer 730. Electrical contact pins 43 and 45 project downwardly through a bore 732 formed through the base 714 of the receptacle 712. As was previously discussed with regard to the various saddle embodiments, the piezoelectric material layer 722 has a metallic outer coating and the electrical contact layers 728 and 730 are bonded to the metallic coatings of the layer 722 utilizing an electrically conductive adhesive, whereby good electrical interconnection between the piezoelectric material and the electrical contacts 728 and 730 is obtained. The transducer unit, comprised of the layers 728, 722 and 730 is adhesively bonded within the U-shaped slot 713 of the receptacle 712 utilizing a standard, non-electrically conductive adhesive. As with the prior embodiment discussed hereinabove, each of the length, thickness and height dimensions of the saddle may be easily adjusted by the user to fit the saddle 710 into an existing bridge slot.

It is to be understood that either or both of the novel features that are presented in embodiments 510 and 610 may be incorporated into the embodiment 710. Specifically, a plurality of notches (such as 512) may be formed through the saddle 710 to create individualized string support portions (such as 580), as taught in embodiment 510. Additionally, the piezoelectric material may be comprised of a plurality of separate piezoelectric pieces (such as pieces 623 taught in embodiment 610), whereby individualized piezoelectric outputs associated with each string are achieved.

Although the piezoelectric layer 722 does not project throughout the entire height of saddle 710, the piezoelectric material layer 722 still comprises a significant structural element of the saddle 710, whereby practically all of the musical string vibrations that cause mechanical distortion of the saddle 710 will pass through the piezoelectric material layer 722. Thus, the vertical orientation of the piezoelectric layer 722 within the saddle 710 provides for a significant enhancement in signal strength.

FIGS. 21, 22 and 23 depict yet a further saddle embodiment 810 of the present invention, wherein FIG. 21 is a perspective view, FIG. 22 is a front elevational view and FIG. 23 is a side elevational view. As depicted in FIGS. 21, 22 and 23, the saddle 810 includes a generally rectangular, U-shaped receptacle 812 which may be generally thought of as an inverted U-shaped receptacle 712 of the saddle 710. The receptacle 812 has a top portion 814 and two downwardly depending leg portions 820 and 836 which correspond to the frontward and rearward layers 720 and 736 of the saddle 710. The receptacle 812 is preferably formed from mycarta or other similar materials. Disposed within the U-shaped slot 713 of the receptacle 812 is an identical transducer assembly to that utilized with saddle 710, including a frontward electrical contact plate 728, a piezoelectric material layer 722 and a rearward electrical contact plate 730. As previously discussed, the contact plates 728 and 730 are electrically, adhesively bonded to the piezoelectric material layer 722. Electrical contact pins 143 and 145 depend downwardly from the electrical contact layers 728 and 730 respectively.

As with all of the previously discussed embodiments, the piezoelectric material layer 722 comprises a significant structural element of the saddle 810, whereby practically all of the musical string vibrations that cause mechanical distortion of the saddle 810 will pass through the piezoelectric material layer 722. Thus, the vertical orientation of the piezoelectric layer 722 within the saddle 810 provides for a significant enhancement in signal strength. As with prior embodiments discussed hereinabove, the saddle 810 may be dimensionally altered in each of its length, thickness and height to be fit into existing bridge slots for proper usage.

It is to be noted that the saddle 810 includes a top portion 814 of material which makes contact with the guitar strings 16, whereby significant height adjustments to the saddle 810 require filing or grinding of the bottom surface of the saddle 810 rather than the top surface 814; although the top surface must be rounded and arc shaped for proper usage. It is also to be noted that the top surface 814 of the saddle 810 is composed of an electrically nonconductive material, whereby the electrically conductive strings of the musical instrument are not grounded through the saddle 810. To accomplish the grounding of the electrically conductive strings, the bridge pins 71 of the guitar may be grounded, as is known in the art.

It is to be understood that either or both of the novel features that are presented in embodiments 510 and 610 may be incorporated into the embodiment 810. Specifically, a plurality of notches (such as 512) may be formed through the saddle 810 to create individualized string support portions (such as 580), as taught in embodiment 510. Additionally, the piezoelectric material may be comprised of a plurality of separate piezoelectric pieces (such as pieces 623 taught in embodiment 610), whereby individualized piezoelectric outputs associated with each string are achieved.

A further alternative embodiment 910 of the present invention is depicted in FIG. 24, which depicts a side elevational view that is similar in many respects to the device depicted in FIG. 23. The embodiment 910 includes a generally U-shaped receptacle having downwardly projecting portions 820 and 836 as discussed with regard to the prior embodiment 810. A piezoelectric transducer assembly comprising the vertically oriented piezoelectric layer 722 disposed between the two electrical contacts 728 and 730 is disposed within the U-shaped slot of the receptacle 812. In the embodiment 910, a generally rectangular, electrically conductive shield plate 714 is also disposed within the U-shaped slot, and a layer of nonconductive material 712 is disposed between the shield plate 714 and the electrical contact 728. An electrical connection, such as through a connecting wire 716, connects the shield plate 914 to the electrical connection pin 145 of the electrical contact 730. It is therefore to be understood that the shield plate 714 provides an electromagnetic shield in front of the electrical contact 728. Such a shield is particularly important where the electrically conductive strings 16 are not otherwise grounded. The utilization of a shield plate, such as plate 714, was discussed hereinabove with regard to the saddle embodiment 10.

As with prior embodiments, the piezoelectric material layer 722 comprises a significant structural element of the saddle 910, whereby practically all of the musical string vibrations that cause mechanical distortion of the saddle 910 will pass through the piezoelectric material layer 722. Thus, the vertical orientation of the piezoelectric layer 722 within the saddle 910 provides for a significant enhancement in signal strength.

As with embodiments 710 and 810, either or both of the novel features that are presented in embodiments 510 and 610 may be incorporated into the embodiment 910. Specifically, a plurality of notches (such as 512) may be formed through the saddle 910 to create individualized string support portions (such as 580), as taught in embodiment 510. Additionally, the piezoelectric material may be comprised of a plurality of separate piezoelectric pieces (such as pieces 623 taught in embodiment 610), whereby individualized piezoelectric outputs associated with each string are achieved.

While the invention has been particularly shown and described with reference to certain preferred embodiments, it will be understood by those skilled in the art that various alterations and modifications in form and in detail may be made therein. Accordingly, it is intended that the following claims cover all such alterations and modifications as may fall within the true spirit and scope of the invention.

What We claim is:

1. A saddle for a stringed musical instrument, said saddle having a length dimension and a height dimension and a thickness dimension, said length, height and thickness dimensions being such that the saddle may be fit into a bridge slot of said stringed musical instrument, comprising:

at least one layer of piezoelectric material, said piezoelectric material layer extending substantially throughout said height dimension of said saddle, said piezoelectric material layer having an electrically active frontward face and an electrically active rearward face, said frontward and rearward faces being disposed in a perpendicular relationship to a musical instrument string that is disposed upon said saddle when said saddle is engaged within said bridge slot.

2. A saddle as described in claim 1 wherein said saddle also includes a first electrical contact layer, said first layer being electrically engaged to said front surface of said piezoelectric material layer; and a second electrical contact layer, said second layer being electrically engaged to said rearward surface of said piezoelectric material layer.

3. A saddle as described in claim 2 wherein said piezoelectric material layer includes a plurality of separate pieces of piezoelectric material.

4. A saddle for a stringed musical instrument, said saddle comprising:

a laminated structure having a thickness that is adapted for insertion into an existing bridge slot of a musical instrument, said laminated structure including a plurality of layers, each said layer forming a portion of said thickness of said saddle, whereby said thickness of said saddle is comprised of said layers;

a first one of said layers including a first electrical contact;

a second one of said layers being composed of a piezoelectric material, said piezoelectric material layer having an electrically active frontward surface and an electrically active rearward surface;

a third one of said layers including a second electrical contact;

said first layer being electrically engaged to said frontward surface of said piezoelectric material layer, and said third layer being electrically engaged to said rearward surface of said piezoelectric material.

5. A saddle as described in claim 4 wherein said electrical engagement of said first layer with said piezoelectric material is accomplished utilizing an electrically conductive adhesive material, and said electrical engagement of said third layer with said piezoelectric material is accomplished using an electrically conductive adhesive material.

6. A saddle as described in claim 5 further including a fourth layer of material, said fourth layer of material being bonded to said third layer and providing additional thickness to said saddle, said fourth layer being composed of a material that is easily worked, such that the thickness of said saddle is easily modified.

7. A saddle as described in claim 4, further including a receptacle member having length and height dimensions which define a generally rectangular shape, and a thickness that is substantially less than said length and height dimensions thereof;

said receptacle member having a U-shaped slot formed within said thickness thereof;

said U-shaped slot having a height which is substantial relative to said height of said receptacle member;

said first, second and third layers being fixedly engaged within said slot.

8. A saddle as described in claim 7 wherein said receptacle member is composed of a material that is easily worked, whereby said saddle may be rapidly shaped to form a particular type of saddle.

9. A saddle as described in claim 4, wherein at least one notch is formed through said piezoelectric material layer, from said frontward surface to said rearward surface.

10. A saddle as described in claim 4, wherein said layer of piezoelectric material includes a plurality of separate piezoelectric material pieces.

11. A musical instrument having an improved saddle, comprising:

a musical instrument body member having a frontward end including a musical string tension adjusting device and a rearward end including a musical string tie down device;

a plurality of musical strings disposed between said frontward end and said rearward end;

a saddle, said saddle being engaged to said body member, said saddle having a length dimension and a height dimension and a thickness dimension;

said saddle including at least one layer of piezoelectric material, said piezoelectric material layer extending substantially throughout said height dimension of said saddle, said piezoelectric material layer having an electrically active frontward surface and an electrically active rearward surface, said frontward and rearward surfaces being disposed in a perpendicular relationship to at least one of said musical instrument strings that is disposed upon said saddle when said saddle is engaged to said body member.

12. A musical instrument as described in claim 11 wherein said saddle also includes a first electrical contact layer, said first layer being electrically engaged to said frontward surface of said piezoelectric material layer; and a second electrical contact layer, said second layer being electrically engaged to said rearward surface of said piezoelectric material layer.

13. A musical instrument as described in claim 12 further including a bridge member, said bridge member having a bridge slot formed therein, said bridge slot being disposed substantially perpendicularly to said strings and located generally proximate to said rearward end;

said bridge slot having a width which is substantially equal to said thickness dimension of said saddle, and wherein said saddle is insertably disposed within said bridge slot through said thickness dimension of said saddle.

14. A musical instrument as described in claim 13 wherein said piezoelectric material layer includes a plurality of separate pieces of piezoelectric material.

15. A musical instrument having an improved saddle, comprising:

a musical instrument body member having a frontward end including a musical string tension adjusting device and a rearward end including a musical string tie down device;

a plurality of musical strings disposed between said frontward end and said rearward end;

a saddle, said saddle being engaged to said body member, said saddle having a length dimension and a height dimension and a thickness dimension;

said saddle including a plurality of layers, each said layer forming a portion of said thickness of said saddle, whereby said thickness of said saddle is comprised of said layers;

a first one of said layers including a first electrical contact;

a second one of said layers being composed of a piezoelectric material, said piezoelectric material layer having a frontward surface and a rearward surface;

a third one of said layers including a second electrical contact;

said first layer being electrically engaged to said frontward surface of said piezoelectric material layer, and said third layer being electrically engaged to said rearward surface of said piezoelectric material.

said saddle being engaged to said body member such that said frontward surface faces said frontward end of said musical instrument and said rearward surface faces said rearward end of said musical instrument.

16. A musical instrument as described in claim 15 further including a bridge member, said bridge member having a bridge slot formed therein, said bridge slot being disposed substantially perpendicularly to said strings and located generally proximate to said rearward end;

said bridge slot having a width which is substantially equal to said thickness dimension of said saddle, and wherein said saddle is insertably disposed within said bridge slot through said thickness dimension of said saddle.

17. A musical instrument as described in claim 16 wherein said electrical engagement of said first layer with said piezoelectric material is accomplished utilizing an electrically conductive adhesive material, and said electrical engagement of said third layer with said piezoelectric material is accomplished using an electrically conductive adhesive material.

18. A musical instrument as described in claim 17 wherein said saddle further includes a fourth layer of material, said fourth layer of material being bonded to said third layer and providing additional thickness to said saddle, said fourth layer being composed of a material that is easily worked, such that the thickness of said saddle is easily modified.

19. A musical instrument as described in claim 16, wherein said saddle further includes a receptacle member having length and height dimensions which define a generally rectangular shape, and a thickness that is substantially less than said length and height dimensions thereof;

said receptacle member having a U-shaped slot formed within said thickness thereof;

said U-shaped slot having a height which is substantial relative to said height of said receptacle member;

said first, second and third layers being fixedly engaged within said slot.

20. A musical instrument as described in claim 19 wherein said receptacle member is composed of a material that is easily worked, whereby said saddle may be rapidly shaped to form a particular type of saddle.

21. A musical instrument as described in claim 15, wherein at least one notch is formed through said piezoelectric material layer, from said frontward surface to said rearward surface.

22. A musical instrument as described in claim 15, wherein said layer of piezoelectric material includes a plurality of separate piezoelectric material pieces.

* * * * *